United States Patent [19]

Pettibone et al.

[11] Patent Number: 4,695,073
[45] Date of Patent: Sep. 22, 1987

[54] TOE AND CAMBER ADJUSTING SYSTEM

[75] Inventors: Craig R. Pettibone, Lafayette; Jimmy D. Berry, Longmont, both of Colo.

[73] Assignee: Specialty Products, Inc., Longmont, Colo.

[21] Appl. No.: 850,948

[22] Filed: Apr. 11, 1986

[51] Int. Cl.⁴ .............................................. B62D 17/00
[52] U.S. Cl. ..................................... 280/690; 280/661
[58] Field of Search ............... 280/661, 690, 701, 696, 280/95 R

[56] References Cited

U.S. PATENT DOCUMENTS

| | | | |
|---|---|---|---|
| 3,526,413 | 9/1970 | Muller | 280/661 |
| 3,880,444 | 4/1975 | Bridges | 280/661 |
| 4,424,984 | 1/1984 | Shiratori et al. | 280/661 |
| 4,537,420 | 8/1985 | Ito et al. | 280/661 |

Primary Examiner—John J. Love
Assistant Examiner—Ross Weaver
Attorney, Agent, or Firm—Klaas & Law

[57] ABSTRACT

A system for providing toe and camber adjustment for a wheel drum which is normally fixed in location on a vehicle wherein one end of a control arm is relatively fixedly mounted on the wheel drum and the other end of the control arm is mounted for movement in an arcuate path about a relatively fixed axis for changing the angular relationship between the longitudinal axis of the vehicle and the rotational axis of the wheel drum so as to vary the toe and camber of the wheel drum.

16 Claims, 11 Drawing Figures

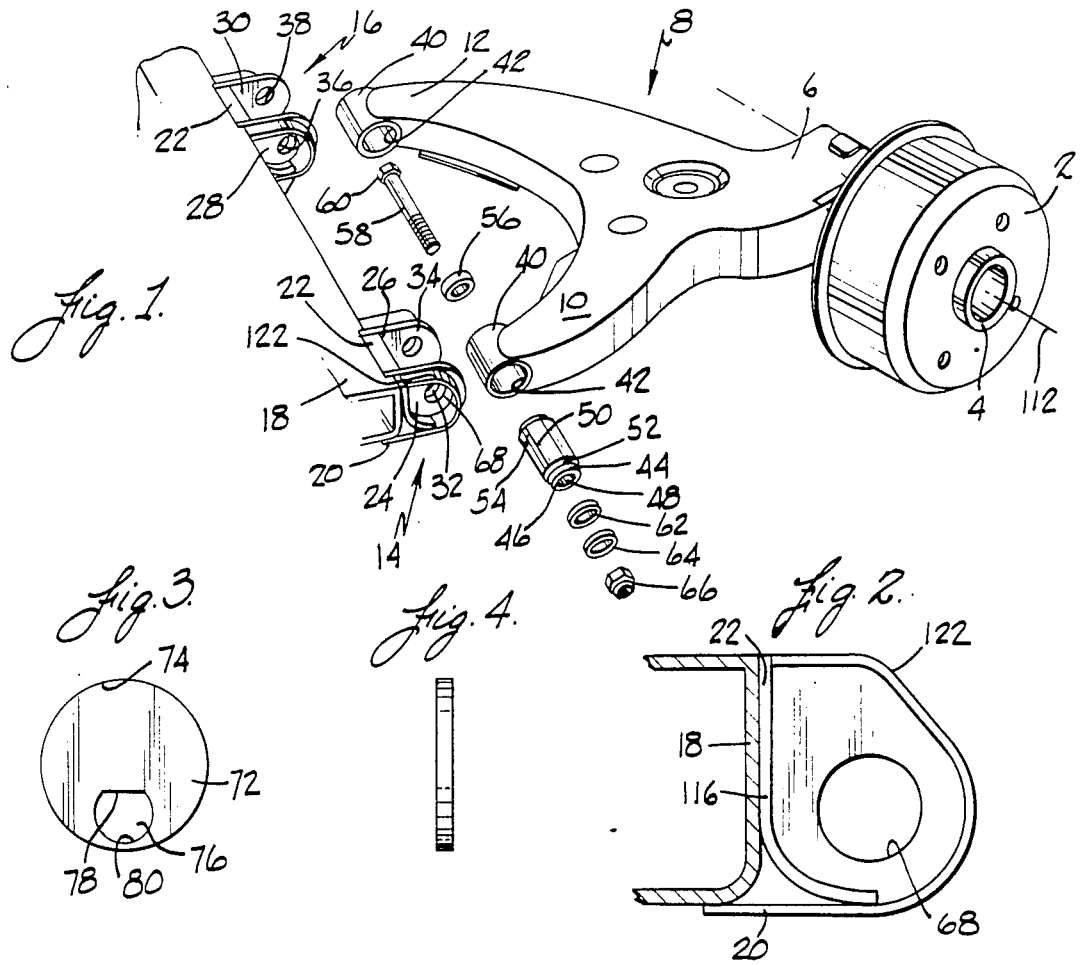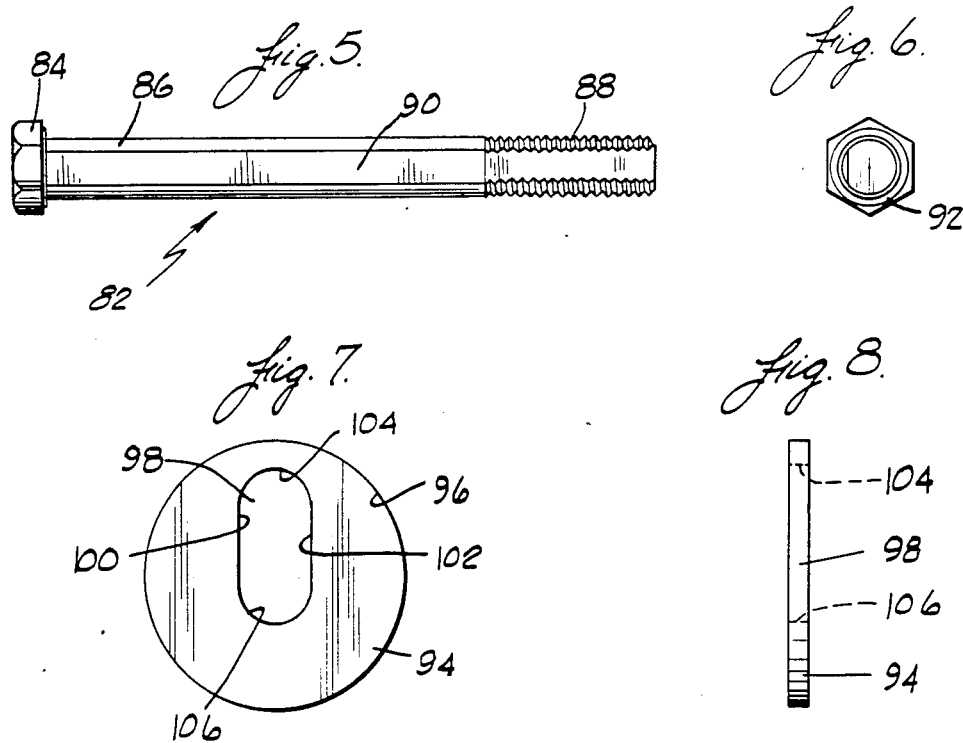

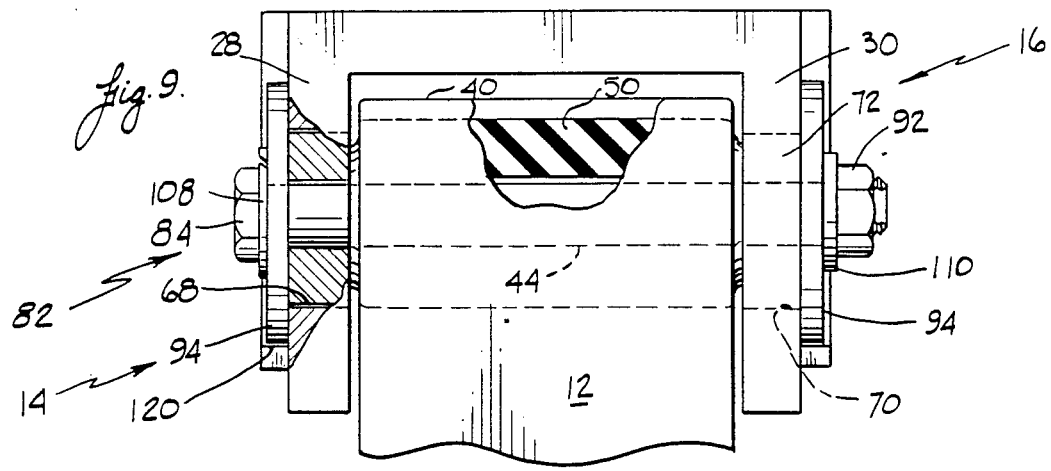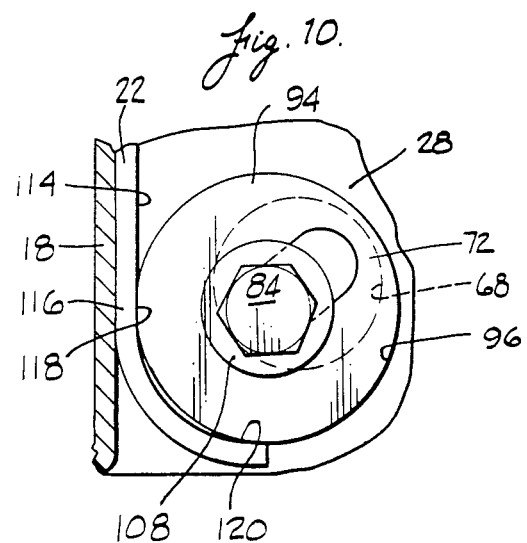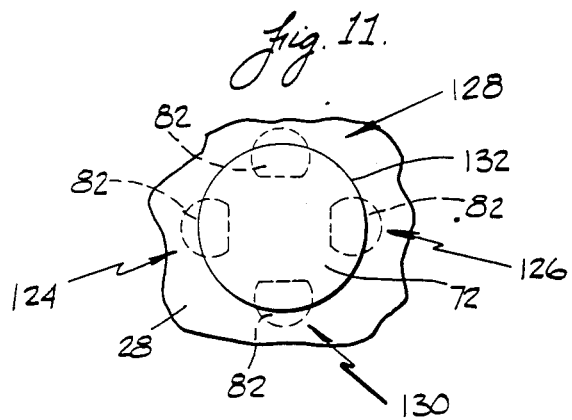

TOE AND CAMBER ADJUSTING SYSTEM

FIELD OF THE INVENTION

The present invention relates generally to automotive products and, more particularly, to a system for adjusting the toe and camber in the nonsteerable rear wheels of a vehicle having an independent rear wheel suspension system.

BACKGROUND OF THE INVENTION

In a conventional independent rear suspension system for an automotive vehicle, each rear wheel is mounted independently of the other, i.e., there is no common rear axle. Each rear wheel is rotatably mounted on a wheel spindle which is, in turn, fixedly bolted to the lower end of an elongate, generally vertically extending shock strut. The upper end of the shock strut is attached to a body side panel, typically by a rubber insulated top mount assembly with attachment bolts. Due to the length and resiliency of the shock strut, the spindle and attached tire are, to a small degree, displaceable in a direction perpendicular to the longitudinal axis of the shock strut and are also torsionally (twistably) displaceable about this axis if otherwise unrestrained. In order to restrain this movement and hold the wheel in a fixed orientation with respect to the vehicle frame, there is provided a control arm comprising a central portion affixed to the spindle and outwardly oppositely extending ends, each end being affixed to a bracket secured to the vehicle frame. Due to manufacturing tolerances etc. in the rear wheel assembly, the "toe" and "camber" of a rear wheel in some cases needs adjustment.

The control arm, which determines the lateral position of the forward and rear portions of the spindle and thus the toe of the associated wheel and the vertical position of the top and bottom portion of the spindle and thus the camber of the associated wheel are provided with bushings at either end thereof for accepting a bolt to attach each end to a bracket secured to the vehicle frame. The attachment hole portions in the spindle and the bracket on the vehicle frame are of approximately the same diameter as the attachment bolts. The only method of adjusting the toe of a tire in such an arrangement is provided by the "slop" between the bolt receiving holes in the control arm frame and spindle and the diameter of the corresponding attachment bolts. To make toe and camber adjustments in such an assembly, the attachment bolts at the ends of a control arm are loosened while the vehicle is supported on toe and camber adjustment plates. Thereafter, one mechanic moves the wheel laterally to a desired toe or camber position to the extend possible and another mechanic retightens the bolts. A problem with this solution is that due to vibration etc. of the vehicle during ordinary use, the toe and camber of the vehicle may shift because of lack of positive lateral restraint between the bolts, control arm and the attachment portions of the frame and spindle. Another problem with such an adjustment procedure is that only a relatively small amount of toe or camber adjustment is possible since the amount of "slop" between the bolts and associated holes is usually relatively small. Yet another problem with such an adjustment procedure is that it requires the service of two mechanics. One prior art device uses cams which are mounted in built up bosses.

SUMMARY OF THE INVENTION

The present invention comprises a method and apparatus for adjusting the toe and camber in a vehicle having an independent rear suspension. The toe and camber adjustment assembly comprises means for moving at least a portion of the inner end of a control arm on which the spindle and wheel drum are supported through an arcuate path about a relatively fixed axis for changing the angular relationship between the longitudinal axis of the vehicle and the rotational axis of the wheel drum. If desired, both inner and outer ends of the control arm are mounted so that each end can be moved through an arcuate path about a relatively fixed axis for changing the angular relationship between the longitudinal axis of the vehicle and the rotational axis of the wheel drum so as to provide for a relatively great adjustment of the toe and camber of the wheel drum. Means are provided to retain the ends of the control arm in the adjusted position.

In one embodiment of the invention, a vehicle having a longitudinal axis has means for mounting at least one wheel drum thereon for rotation about an axis extending generally perpendicular to the longitudinal axis of the vehicle. A control arm has a central portion thereof operatively associated with the means for mounting the wheel drum and is provided with ends extending outwardly from the central portion. One of the ends of the control arm, preferably the outer end relative to the longitudinal axis of the vehicle, is mounted in a bracket mounted in a fixed position on the vehicle frame so as to permit slight relative movement between the one end and the bracket. The other end of the control arm is mounted in a second bracket mounted in a fixed position on the vehicle frame. Means are provided for moving at least a portion of the other end of the control arm through an arcuate path about an axis spaced from the other end and extending perpendicularly to the longitudinal axis of the vehicle so as to adjust the toe and camber of the wheel. In another embodiment of the invention, the entire other end is maintained in a relatively horizontal position as it is moved in a circular path about a relatively fixed axis for changing the angular relationship between the longitudinal axis of the vehicle and the rotational axis of the wheel drum so as to adjust the toe and camber of the wheel drum. In another embodiment of the invention, the entire other end of the control arm is moved in a circular path about a relatively fixed axis for changing the angular relationship between the longitudinal axis of the vehicle and the rotational axis of the wheel drum so as to adjust the toe and camber of the wheel drum.

It is an object of the invention to provide a toe and camber adjusting system for a wheel drum which is normally mounted in a relatively fixed position on a vehicle.

It is an object of this invention to provide a toe and camber adjusting system for a wheel drum which is normally mounted in a relatively fixed position on a vehicle using structure which is originally present on the vehicle.

Additional objects, advantages, and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWING

FIG. 1 is a schematic illustration in an exploded view of a portion of a rear suspension system on a commercially available vehicle;

FIG. 2 is a side elevational view of a modification of a portion of the structure in FIG. 1;

FIG. 3 is a front elevational view of a cam disk of this invention;

FIG. 4 is a side elevational view of FIG. 3;

FIG. 5 is a side elevational view of a bolt for use in this invention;

FIG. 6 is a front elevational view illustrating a nut applied to the bolt of FIG. 5;

FIG. 7 is a front elevational view of a slotted washer for use in this invention;

FIG. 8 is a side elevational view of FIG. 7;

FIG. 9 is a side elevational view with parts in section of the adjusting system of this invention;

FIG. 10 is a view of a portion of FIG. 9 when the parts are secured in position after the adjustment has been made; and FIG. 11 illustrates various positions of the bolt for toe and camber adjustments.

DETAILED DESCRIPTION OF THE INVENTION

In FIG. 1, there is a schematic illustration in an exploded view of a portion of the rear suspension of a conventional motor vehicle. In FIG. 1, a wheel drum 2 is mounted on a spindle 4, which extends from the drive assembly (not shown) which rotates the spindle 4 to rotate the wheel drum. The spindle 4 is securely mounted in a central portion 6 of a control arm 8 so as to allow for rotational movement of the spindle 4, but no other relative movement between the spindle 4 and the central portion 6. Extending outwardly from the central portion 6 of the control arm 8 are an outer end 10 and an inner end 12. As illustrated in FIG. 1, the outer end 10 is closer to the wheel drum 2 than the inner end 12. A pair of spaced apart brackets 14 and 16 are secured to a portion 18 of the frame of the vehicle. Each bracket has a portion 20 secured to the underside of the portion 18 and a base 22 secured to a side of the portion 18 of the vehicle frame. Each bracket has a pair of spaced apart arms 24 and 26 on bracket 14 and 28 and 30 on bracket 16 extending outwardly from the base 22. Aligned openings 32, 34, 36 and 38 are provided respectively in the arms 24, 26, 28, 30.

The normal assembly of the control arm 8 onto the vehicle is illustrated in FIG. 1 in an exploded view of the parts. The following explanation is directed to outer end 10 but it is understood that the same assembly is used for inner end 12. The outer end 10 has a tube 40 secured thereto with the tube 40 having a generally cylindrical inner surface 42. A tube 44 having a generally cylindrical outer 46 and inner 48 surface is provided with a rubber sleeve 50 that has a generally cylindrical inner surface 52 having a diameter substantially the same as the diameter of the generally cylindrical outer surface 46 of the tube 44 so as to provide a friction fit therebetween. The rubber sleeve 50 has an outer surface 54 having a diameter substantially the same as the diameter of the generally cylindrical inner surface 42 of the tube 40 so that when the tube 44 is positioned in the tube 40, there is a friction fit therebetween. In assembly, the tube 44 is inserted into the tube 40 and the end 10 is moved between the arms 24 and 26. A washer 56 is placed on the bolt 58 which is then inserted through opening 34 in the arm 26, inner surface 48 of the tube 44 and opening 32 in the arm 24 so that the washer 56 is between the bolt head 60 and the arm 26. Two washers 62 and 64 and a nut 66 are positioned on the threaded portion of the bolt 58 and the nut 66 is tightened so as to secure the outer end 10 in the bracket 14.

The invention in this application modifies at least one of the ends 10 and 12, preferably the inner end 12, so as to provide for toe and camber adjustments for the wheel drum 2. The first step is to enlarge the openings 36 and 38 from their original size of about 0.375 inch to form openings 68 and 70, FIG. 9, therein, each having a diameter of about 1.0 inch. A disk 72, illustrated in FIGS. 3 and 4, having an outer generally cylindrical surface 74 having a diameter of about 1.0 inch is adapted to be mounted in each of the openings 68 and 70 so as to have a rotatable fit therein. The thickness of the disk 72 and each arm 28 and 30 is approximately the same. Each disk 72 is provided with an offset opening 76 having a linear portion 78 and an arcuate portion 80 which is a portion of a circle. A bolt 82, illustrated in FIG. 5, having a hexagonal head 84, a central shank 86, a threaded end portion 88 and a longitudinally extending flat surface 90 is provided for a purpose described below. A threaded nut 92, illustrated in FIG. 6, for engagement with the threaded portion 88 of the bolt 82 is also provided. A washer 94, illustrated in FIGS. 7 and 8, having a generally cylindrical outer surface 96 and an enlarged slot 98 with opposed linear surfaces 100 and 102 and opposed semi-cylindrical surfaces 104 and 106 is also provided for a purpose described below.

In assembling the toe and camber adjustment system of this invention, as illustrated in FIG. 9, the openings 36 and 38 are enlarged as described above to form openings 68 and 70 in the arms 14 and 16. A disk 72 is placed in the opening 68. A lock washer 108 is placed over the bolt 82 and moved to a position adjacent the hexagonal head 84. The lock washer 108 has an outer diameter substantially greater than the distance between the opposed linear surfaces 100 and 102 of the washer 94. A washer 94 is then positioned over the bolt 82 so that it is adjacent the lock washer 108. The distance between the opposed linear surfaces 100 and 102 and the opposed semi-cylindrical surfaces 104 and 106 is substantially greater than the cross-sectional configuration of the bolt 82 so as to provide for substantial relative movement between the bolt 82 and the washer 94. The inner end 12, having the original assembly of the tube 44 and rubber sleeve and associated parts in the tube 40 as described above, is inserted between the arms 36 and 38 with the inner cylindrical surface 48 of the tube 44 aligned with the openings 76 in the disks 72. The threaded portion 88 of the bolt 82 is then inserted into the opening 76 of the disk 72 in the arm 28 so that the flat surface 90 of the bolt 82 is adjacent to the linear portion 78 of the disk 72 so as to prevent relative rotational movement therebetween. The insertion of the bolt 82 is continued until the threaded portion 88 passes through the opening 70 in the arm 30 and extends outwardly from the arm 30. A disk 72 is placed over the threaded portion 88 with the flat surface 90 of the threaded portion 88 adjacent the linear portion 78 of the disk 72 so as to prevent relative rotational movement therebetween. The disk 72 is moved over the bolt 82 until it is positioned in the opening 70 in the arm 30. A washer 94 is then positioned over the threaded portion 88 of the bolt 82 and moved thereover to a position adjacent the disk 72. A lock washer 110 is then positioned over the threaded portion 88 of the bolt 82 and moved thereover to a position adjacent the washer 94. A nut 92 is then threaded onto the threaded portion 88 of the bolt 82 but is not tightened. The outer end 10 is assembled onto the bracket 14 as described above.

A tool (not shown), such as a wrench is inserted over the hexagonal head 84 and a torque is applied to the bolt 82 so as to rotate the disks 72. The offset location of the opening 76 in the disk 72 causes the tube 44 and therefore the end 12 to be moved in an arcuate path, which path is circular, so as to change the angular relationship of the longitudinal axis 112 of the spindle 4 relative to the longitudinal axis of the vehicle so as to change the toe and camber of the wheel drum 2.

After the disks 72 have been moved to a desired position, a wrench (not shown) is applied to the nut 92 and a torque is applied thereto so as to tighten the nut 92. The washers 94 are moved relative to the bolt 82 so that the outer surface 96 of each washer 94 contacts the surface 114 of a flange 116 at spaced apart locations, preferably at least two 118 and 120, as illustrated in FIG. 10. In the embodiment illustrated in FIG. 2 and 10, the flange 116 is formed as an extension of the base 22. However, it is understood that the flange 116 may be formed in any manner as long as there is an surface 114 to be contacted by the outer surface 96 of the washer 94. Also, a flange 122 may be formed as desired so as to provide some protection for the adjustment assembly. The tightening of the nut 92 is continued until the adjustment assembly is locked in position by the frictional contact of the lock washer 108 with the hexagonal head 84 and the washer 94, the washer 94 with the adjacent surface of the arm 28, the washer 94 with the adjacent surface of the arm 30, and the lock washer 110 with the nut 92 and the washer 94. The contact of the outer surface 96 of the washer 94 against the inner surface 114 of the flange 116 also helps to prevent displacement of the bolt 82 when the assembly is subjected to shocks during the normal operation of the vehicle.

In FIG. 11, there is shown the various locations possible for the bolt 82. The complete range for toe adjustments is between the left 124 and the right 126 locations. The complete range for camber adjustments is between the upper 128 and the lower 130 locations. As the disk 72 is rotated, the center of the bolt 82 moves in the circular path 132. In between the locations 124, 126, 128 and 130, a combination of toe and camber adjustments is made by the various locations of the center of the bolt 82.

In the embodiment described above, a disk 72 is mounted in each of the arms 28 and 30. It is within the spirit of this invention to utilize only one disk 72 mounted for example in the arm 28 while the other mounting for the bolt 82 in the other arm 30 would be a conventional nature to allow spherical movement of the bolt 82. Also, in some instances, it may be necessary to loosen the nut 66 and therefore the assembly of the outer end 10 in the bracket 14 while the toe and camber adjustment is made and then to retighten the nut 66.

It is contemplated that the inventive concepts herein described may be variously otherwise embodied and it is intended that the appended claims be construed to include alternative embodiments of the invention except insofar as limited by the prior art.

What is claimed is:

1. Apparatus for adjusting the toe and camber of a normally fixed wheel of a vehicle comprising:
   a vehicle having a longitudinal axis;
   a wheel drum;
   means for mounting said wheel drum on said vehicle for rotation about an axis extending generally perpendicular to said longitudinal axis;
   a control arm having a central portion thereof operatively connected with said means for mounting said wheel drum;
   said control arm having spaced apart ends extending outwardly from said central portion;
   a first bracket mounted in a fixed position on said vehicle;
   said control arm having one of said ends thereof mounted in said first bracket so as to permit slight relative movement between said one end and said first bracket;
   a second bracket mounted in a fixed position on said vehicle;
   mounting means for mounting the other end of said control arm in said second bracket;
   rotatable means in said mounting means for moving at least a portion of said other end of said control arm through an arcuate path about a relatively fixed axis extending in a direction generally perpendicular to said longitudinal axis of said vehicle for changing the angular relationship between said longitudinal axis of said vehicle and said rotational axis of said wheel drum to adjust simultaneously the toe and camber of said wheel drum to a desired position; and
   means for locking said rotatable means to retain said wheel drum in said desired position.

2. Apparatus as in claim 1 wherein:
   said arcuate path is a circle.

3. Apparatus as in claim 1 wherein said second bracket comprises:
   a base secured to said vehicle; and
   a pair of spaced apart arms projecting outwardly from said base.

4. Apparatus as in claim 3 wherein said means for moving said other end of said control arm through an arcuate path about an axis extending in a direction generally perpendicular to said longitudinal axis of said vehicle comprises:
   at least one disk;
   said disk being rotatably mounted in at least one of said arms of said bracket;
   a rod having a longitudinal axis;
   means for mounting said rod on said disk at an eccentric location for movement with said disk;
   said rod being mounted so that its longitudinal axis extends in a direction generally perpendicular to said longitudinal axis of said vehicle; and
   means for mounting said other end of said control arm on said rod to provide for relative rotational movement between said other end of said control arm and said rod and for movement of said other end of said control arm with said rod.

5. Apparatus as in claim 4 and further comprising:
   means for preventing relative rotational movement between said rod and said disk.

6. Apparatus as in claim 5 wherein said means for mounting said other end of said control arm on said rod for relative rotational movement between said other end of said control arm and said rod and for movement of said other end of said control arm with said rod comprises:
- a first tube secured to said other end of said control arm and having a longitudinal axis extending generally perpendicular to said longitudinal axis of said vehicle;
- said first tube having an generally cylindrical inner surface;
- a second tube having an outer resilient sleeve mounted thereon and a generally cylindrical inner surface;
- said outer resilient sleeve having a generally cylindrical outer surface having a diameter substantially the same as the diameter of said generally cylindrical inner surface of said first tube so as to provide for a friction fit after said second tube is positioned in said first tube;
- said second tube positioned in said first tube with said resilient outer surface in contact with said inner surface of said first tube;
- an eccentric opening in said disk;
- said rod having a cross-sectional configuration allowing said rod to pass through said opening in said disk and said generally cylindrical opening in said second tube;
- said rod having portions thereof within said opening in said disk and within said generally cylindrical inner surface of said second tube; and
- means for securing said rod to said arms of said second bracket.

7. Apparatus as in claim 4 wherein said rod comprises:
- a threaded bolt having an enlarged head at one end thereof and a threaded portion at the other end thereof; and
- said means for preventing rotation of said disk after it has been adjusted to a desired position comprises:
  - a washer having an opening therein and positioned on said bolt between said enlarged head and at least one of said arms;
  - a lock washer having an opening therein and positioned on said bolt between said enlarged head and said washer; and
  - force applying means for applying a force to said enlarged head in an amount sufficient to ensure sufficient frictional contact between said one of said arms, said washer, said lock washer and said enlarged head to prevent said rotation of said disk.

8. Apparatus as in claim 7 and further comprising:
- a boss projecting outwardly from said at least one of said arms and having a surface facing said bolt;
- said washer having an outer peripheral surface; and
- means for establishing contact between said surface of said boss and said outer peripheral surface of said washer at at least two spaced apart locations to help prevent displacement of said bolt after said threaded nut has been tightened.

9. Apparatus as in claim 3 wherein said means for moving said other end of said control arm through an arcuate path about an axis extending in a direction generally perpendicular to said longitudinal axis of said vehicle comprises:
- a plurality of disks;
- one of said disks being rotatably mounted in each of said arms of said bracket so that the rotational axis of each of said disks coincides;
- a rod having a longitudinal axis;
- means for mounting said rod on each of said disks at an eccentric location for movement with each of said disks through said arcuate path;
- said rod being mounted so that its longitudinal axis extends in a direction generally perpendicular to said longitudinal axis of said vehicle; and
- means for mounting said other end of said control arm on said rod so as to provide for relative rotational movement between said other end of said control arm and said rod and for movement of said other end of said control arm with said rod.

10. Apparatus as in claim 9 and further comprising:
- means for preventing relative rotational movement between said rod and each of said disks.

11. Apparatus as in claim 9 wherein said means for mounting said other end of said control arm on said rod so as to provide relative rotational movement between said control arm and said rod and for movement of said other end of said control arm with said rod comprises:
- a first tube secured to said other end of said control arm and having a longitudinal axis extending generally perpendicular to said longitudinal axis of said vehicle;
- said first tube having an generally cylindrical inner surface;
- a second tube having an outer resilient sleeve mounted thereon and a generally cylindrical inner surface;
- said outer resilient sleeve having a generally cylindrical outer surface having a diameter substantially the same as the diameter of said generally cylindrical inner surface of said first tube so as to provide for a friction fit after said second tube is positioned in said first tube;
- said second tube positioned in said first tube with said resilient outer surface in contact with said inner surface of said first tube;
- an eccentric opening in said disk;
- said rod having a cross-sectional configuration allowing said rod to pass through said opening in said disk and said generally cylindrical opening in said second tube;
- said rod having portions thereof within said opening in said disk and within said generally cylindrical inner surface of said second tube; and
- means for securing said rod to said arms of said second bracket.

12. Apparatus as in claim 11 wherein said rod comprises:
- a bolt;
- said bolt having an enlarged head portion adjacent one end thereof and a threaded portion adjacent the other end thereof; and
- said means for preventing rotation of said disk after it has been adjusted to a desired position comprises:
  - a first lock washer having an opening formed therein and positioned on said bolt and located adjacent said enlarged head of said bolt;
  - said lock washer having first and second surfaces with such first surface facing said enlarged head;
  - a first washer having an opening formed therein and positioned on said bolt;
  - said first washer having an outer surface having a cross-sectional configuration greater than the cross-sectional configuration of said disk;
  - said first washer having first and second surfaces with said first surface facing said second surface of said lock washer;

each of said arms of said second bracket having inner and outer surfaces with said inner surfaces facing each other;

a second washer having an opening formed therein and positioned on said bolt;

said second washer having a cross-sectional configuration greater than the cross-sectional configuration of said disk;

said second washer having first and second surfaces with said first surface facing the other of said outer surfaces of the other of said arms;

a second lock washer having an opening formed therein and positioned on said rod;

said second lock washer having a first and second surface with said first surface facing said second surface of said second washer;

a threaded nut adapted to be threaded onto said threaded portion of said bolt;

said nut having a surface facing said second surface of said second lock washer; and said threaded nut being tightened on said threaded portion of said bolt in an amount sufficient to ensure sufficient frictional contact between said enlarged head of said bolt and said first surface of said first lock washer; said second surface of said first lock washer and said first surface of said first washer; said second surface of said first washer and said one of said outer surfaces of said one of said arms; said first surface of said second washer and said other of said outer surfaces of said other of said arms; said second surface of said second washer and said first surface of said second lock washer; and said second surface of said second lock washer and said surface of said threaded nut to prevent said rotation of said disks.

13. Apparatus as in claim 12 and further comprising:

a boss projecting outwardly from each of said arms and having a surface facing said bolt;

each of said washers having an outer peripheral surface; and means for establishing contact between said surface of each of said bosses and said outer peripheral surface of each of said washers at at least two spaced apart locations to help prevent displacement of said bolt after said threaded nut has been tightened.

14. A method for providing toe and camber adjustment for a normally fixed wheel of a vehicle comprising:

providing a vehicle having a longitudinal axis;

mounting a wheel drum on said vehicle for rotation about an axis extending generally perpendicularly to said longitudinal axis of said vehicle;

providing a control arm having a central portion thereof operatively connected with said wheel drum and spaced apart ends extending outwardly from said central portion;

providing a first bracket mounted in a fixed position on said vehicle;

mounting one end of said control arm in said first bracket;

providing a second bracket mounted in a fixed position on said vehicle;

mounting the other end of said control arm by mounting means in said second bracket;

rotating said mounting means to move said other end of said control arm through an arcuate path about a relatively fixed axis extending in a direction generally perpendicular to said longitudinal axis of said vehicle for changing the angular relationship between the longitudinal axis of said vehicle and the rotational axis of said wheel drum so as to adjust simultaneously the toe and camber of said wheel drum to a desired position; and locking said mounting means to retain said wheel drum in said desired position.

15. A method as in claim 14 and further comprising:

maintaining said other end of said control arm in a relatively horizontal position during said movement in said arcuate path.

16. A method as in claim 14 and further comprising:

modifying an existing bracket on said vehicle to provide for said movement in said arcuate path.

* * * * *